Oct. 4, 1966      R. A. WITT      3,276,556
AXIALLY RESTRAINED FLUID CLUTCH
Filed Nov. 30, 1964      2 Sheets-Sheet 1
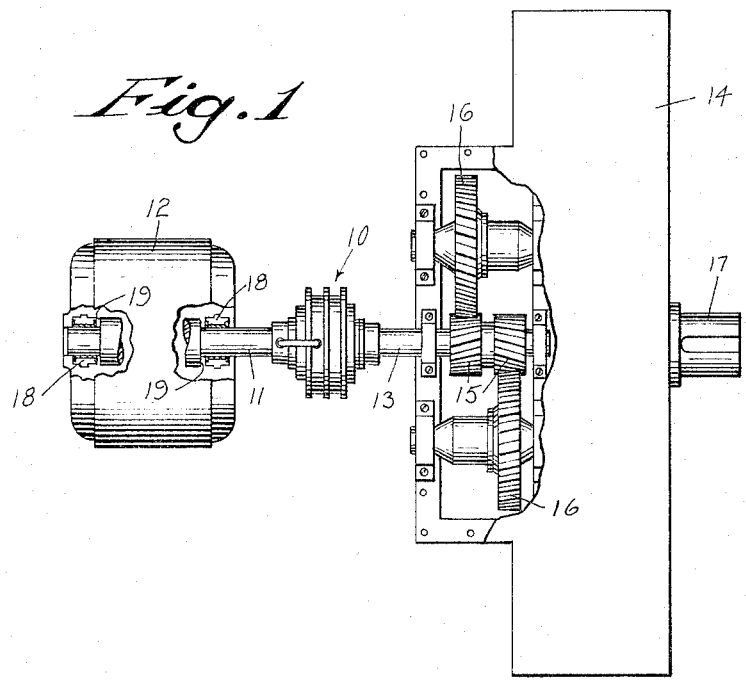
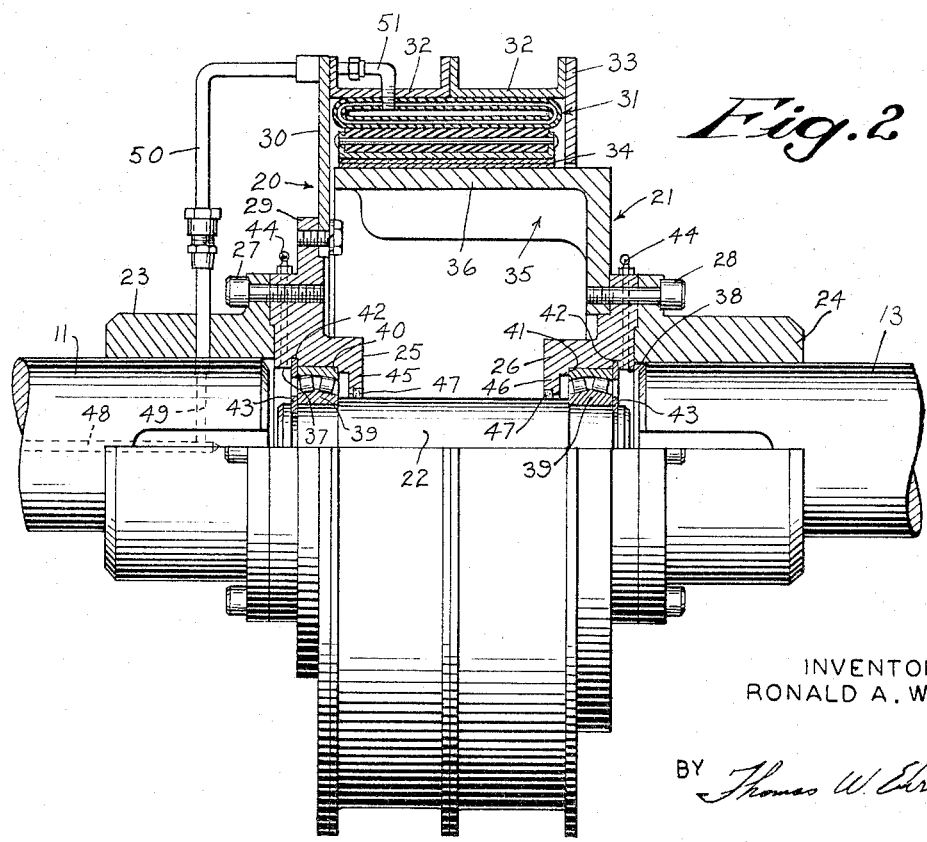
INVENTOR
RONALD A. WITT
BY *Thomas W. Ehrmann*
ATTORNEY Oct. 4, 1966    R. A. WITT    3,276,556
AXIALLY RESTRAINED FLUID CLUTCH
Filed Nov. 30, 1964    2 Sheets-Sheet 2

INVENTOR
RONALD A. WITT

BY
Thomas W. Ehrmann
ATTORNEY

United States Patent Office 3,276,556
Patented Oct. 4, 1966

3,276,556
AXIALLY RESTRAINED FLUID CLUTCH
Ronald A. Witt, Brown Deer, Wis., assignor to The Falk Corporation, Milwaukee, Wis., a corporation of Wisconsin
Filed Nov. 30, 1964, Ser. No. 414,644
9 Claims. (Cl. 192—110)

This invention relates to clutches, and particularly to a rotary fluid pressure clutch for connection between substantially aligned shafts and that includes means for axially restraining and locating such shafts relative to each other when the clutch is engaged or disengaged without affecting the ability of the clutch to accept parallel and angular misalignments of the shafts.

Rotary fluid pressure clutches generally include a pair of clutch assemblies that are mounted on the respective ends of spaced substantially aligned driving and driven shafts. One of the clutch assemblies carries a fluid pressure responsive member, usually in the form of a distensible bag, that is expanded to affect a torque transmitting engagement with an opposing surface of the other clutch assembly and that is contractable to release such engagement. Control of the engagement or disengagement of the clutch is provided by controlling the fluid pressure in the distensible bag.

Such rotary fluid pressure clutches connect the driving and driven shafts only when the clutch is engaged. When the clutch is disengaged, the driving and driven shafts are free to move axially under the respective influence of the driving and driven equipment because of the lack of physical connection between the pair of clutch assemblies. Such lack of axial restraint can yield critically undesirable results. For example, it may be desired to employ a fluid pressure clutch between a motor shaft and an axially shiftable input shaft of a speed reducer. Such an input shaft may be found in dual gear train speed reducers in which the input shaft is permitted to float axially to seek a mechanical center that will divide the input load equally between the two gear trains. While the motor shaft may also be capable of limited axial movement, as in a synchronous motor having sleeve bearings, such available movement is usually small compared to the movement of such a floating input shaft. If a fluid clutch is employed in such a situation, after the motor has been started and the clutch engaged the movement of the floating input shaft that is required for it to reach its mechanical center may be greater than the available axial movement in the motor shaft. If this occurs, the large thrust forces tending to move the input shaft of the speed reducer will cause thrust faces on the motor shaft to be wiped against the motor shaft bearings thereby damaging the motor.

When it is necessary to employ a clutch between a vertical driven shaft, which may be axially restrained, and a vertical motor shaft, the use of a fluid pressure clutch has heretofore required the use of motors with special bearing structures to protect the motor when the clutch is disengaged and the weight of the motor shaft and rotor must be borne by the motor. Here again the absence of a physical connection between the shafts when the fluid clutch is disengaged yields undesirable results.

Accordingly, it is a principal object of this invention to provide a rotary fluid pressure clutch that axially restrains and locates the shafts that it connects whether the clutch is engaged or disengaged.

It is another object of this invention to provide a rotary fluid pressure clutch for connection between substantially aligned shafts wherein the clutch physically connects the shafts when the clutch is engaged and disengaged.

It is also an object of this invention to provide such a fluid pressure clutch that accepts angular and parallel misalignment of the connected shafts.

It is a further object of this invention to provide such a fluid pressure clutch that is simple in design and construction and that is as compact as clutches which do not provide for axial restraint.

The foregoing and other objects of the invention will appear in the description which follows. In the description reference is made to the accompanying drawings which form a part hereof and in which there is shown specific embodiments of the invention. These embodiments will be described in detail to enable those skilled in the art to appreciate their construction and operation. Obviously, other embodiments of the invention may be made and structural changes may be made in the embodiments illustrated without departing from the scope of the invention; consequently, the scope of the invention is best defined by the appended claims.

In the drawings:

FIG. 1 is a top plan view of a rotary fluid clutch, shown connecting the motor shaft of an electric motor and the input shaft of a divided load speed reducer, with parts of the motor and speed reducer broken away to illustrate their internal construction;

FIG. 2 is a view in elevation, and partly in vertical section, of a first embodiment of a fluid clutch in accordance with this invention.

Figure 3:
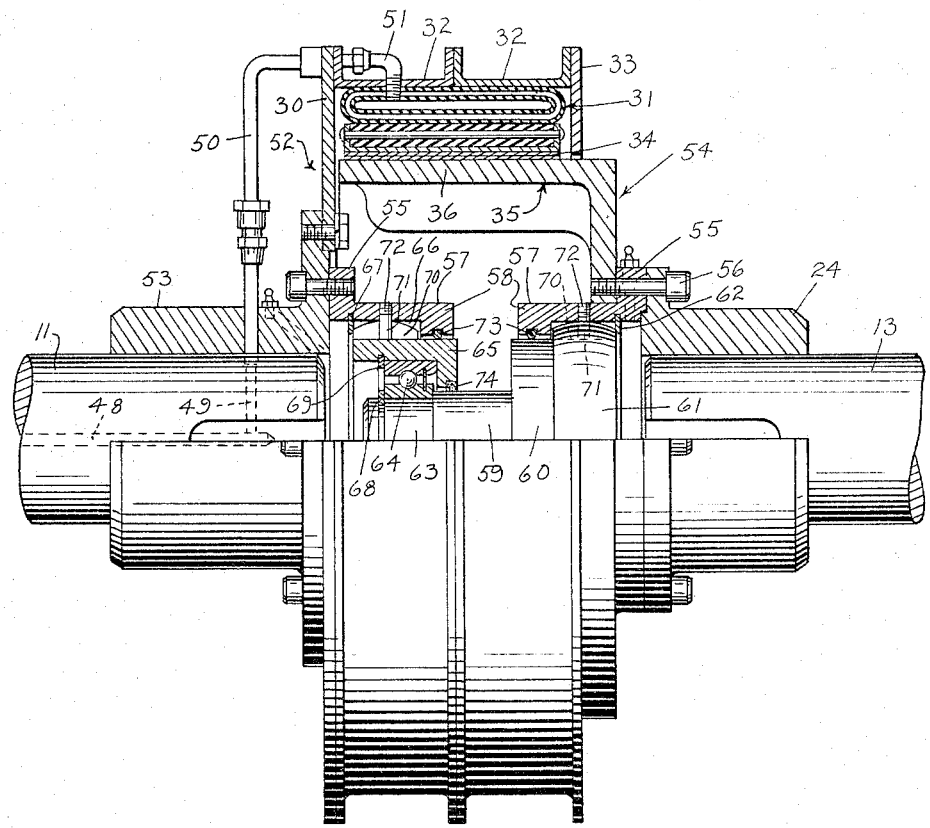
FIG. 3 is a view in elevation, and partly in section, of a second embodiment of a fluid clutch in accordance with this invention.

Referring to FIG. 1, there is shown therein a particular use to which a fluid coupling in accordance with the invention may be put. A fluid clutch 10 is shown connecting a motor shaft 11 of a synchronous electric motor 12 to a high speed shaft 13 of a divided load speed reducer 14. The speed reducer 14 is of the type in which the high speed shaft 13 mounts a pair of high speed helical driving pinions 15 having their teeth oppositely inclined so that a herringbone arrangement is formed. Each of the high speed pinions 15 meshes with and drives a separate gear train, illustrated in part by the primary driven gears 16, each of which gear trains drives one side of a bull gear mounted on a low speed shaft 17. The speed reducer illustrated is fully shown and described in the U.S. Patent 3,088,334, issued May 7, 1963, to W. S. Richardson for "Multiple Reduction Gear Unit." When torque is applied to the high speed shaft 13, the inherent thrust forces of helical gearing cause the high speed pinions 15 to follow the apex formed by the helical high speed gears 16. It is, therefore, necessary to allow the high speed shaft 13 to float freely in its bearings. Any axial restraint will prevent the equal division of the load to the two gear trains.

The motor shaft 11 is located axially between sleeve bearings 18 by two small thrust faces 19 formed on the motor shaft 11. There is a normal clearance between the thrust faces 19 and the bearings 18. When the synchronous motor 12 is energized, the motor shaft 11 will theoretically move axially to its magnetic center. However, the motor shaft 11 could have a thrust face 19 against one of the motor bearings 18 when it is started by being forced to that position because of its own weight or because of screwing action caused by the bearings 18.

Since the fluid clutch 10 is normally disengaged when the motor is started, if the motor shaft 11 is against one of its bearings 18 or if the high speed shaft 13 is further from its torque responsive position then the thrust faces 19 of the motor shaft 11 are from the motor bearings 18, the motor bearings 18 will be wiped when the clutch is engaged and the high speed shaft 13 moves axially to its proper load division position. The inherent thrust forces in the helical high speed pinions 15 have more than enough capacity to thereby damage the motor. A fluid clutch in accordance with this invention prevents this destruction from occuring by providing a physical connection between the motor shaft 11 and the high speed shaft 13 so that such shafts will move as a unit whether the clutch is engaged or disengaged. Thus, it is possible to initially locate the motor shaft 11 in the center of its thrust face clearance when the high speed shaft 13 is at its mechanical center and the danger of damaging the motor by the high thrust forces is eliminated.

Referring now to FIG. 2, the first embodiment of the invention includes, generally, first and second clutch assemblies or structures 20 and 21 and an internally disposed shaft 22 supported at its ends by the clutch assemblies 20 and 21 and axially locating and restraining such clutch assemblies. Specifically, the clutch assemblies 20 and 21 each include a hub 23 and 24, respectively, that surrounds and is keyed to an end of a respective one of the spaced motor shaft 11 and high speed shaft 13. Annular bearing support members 25 and 26 are fitted against the interior faces of the hubs 23 to project beyond the end of the respective shaft in the space between the shafts 11 and 13. The bearing support members 25 and 26 are secured to the hubs 23 and 24 by studs 27 and 28. The bearing support members 25 includes a radially projecting flange 29 that mounts a disc 30 forming a portion of a cage structure for fluid pressure responsive means in the form of a flexible, distensible member indicated generally by the numeral 31. The cage structure includes a pair of annular channel members 32 secured side-to-side and connected between the disc 30 and a second axially spaced disc 33. The flexible member 31 is attached to the inner surface of the joined channel members 32 and has brake shoe elements 34 secured to its radially inner surface.

The second clutch assembly also includes a drum member 35 that is secured to the bearing support member 26 by the studs 28. The drum member 35 includes an axially projecting drum surface portion 36 that is received within the opening in the disc 33 and has its outer periphery opposing the brake shoe elements 34.

The bearing support members 25 and 26 are provided with central bores 37 and 38, respectively, that receive spherical roller bearings 39. The outer race of the bearings 39 are axially located and restrained by shoulders 40 and 41, respectively, formed by the bores 37 and 38 and by snap rings 42 disposed in suitable slots provided in the support members 25 and 26.

The spherical roller bearings 39 support the ends of the internally disposed shaft 22 which is provided with reduced diameter portions to mount and locate the inner races of the bearings 39. Snap rings 43 are provided in slots formed adjacent the ends of the internally disposed shaft 22 to axially restrain the inner race of each spherical roller bearing 39.

The support members 25 and 26 are provided with radial bores that receive grease fittings 44 at their exterior ends. The bores permit lubrication of the spherical roller bearings 39. Each of the support members 25 and 26 is provided with a radial inwardly extending flange 45 and 46, respectively, that receives an oil seal 47 that works against the periphery of the internally disposed shaft 22 to prevent the passage of lubricant to the interior of the clutch.

The details of construction and the manner of engaging and disengaging the flexible member 31 with the drum member 35 is well known in the art and forms no part of the present invention. Generally, however, the flexible member 31 is a hollow bag-like member that receives fluid under pressure to cause the flexible member 31 to expand and thereby have the brake shoe elements 34 frictionally engage the outer periphery of the drum surface portion 36 of the drum member 35. To accomplish the expansion of the flexible member 31 a fluid line is provided which includes a central bore 48 provided in the motor shaft 11 and that leads to a radial bore 49 in the motor shaft 11. Tubing 50 extends from the radial bore 49 through an opening in the hub 23 and thence through the disc 30 and one channel member 32 to a nipple 51 tat leads to the interior of the flexible member 31. To expand the flexible member 31, fluid under pressure is introduced through the motor shaft 11 and the tubing 50. By controlling the pressure of the fluid so introduced the flexible member 31 is extended or permitted to contract to engage or disengage the drum member 35 as desired.

The clutch assemblies 20 and 21 are physically connected by the internally disposed shaft 22, the bearings 39 and the snap rings 42 and 43 all of which are axially located and restrained relative to each other. This physical connection does not depend upon the engagement of the clutch and, since the hubs 23 and 24 of the clutch assemblies 20 and 21, respectively, are axially restrained upon the shafts 11 and 13, the shafts 11 and 13 are effectively physically connected. Thus, the shafts 11 and 13 act as a unit whether the clutch is engaged or disengaged and in the example previously described the motor 12 can be so located relative to the speed reducer 14 such that the motor shaft 11 is centered in its bearings 18 when the high speed shaft 13 is at its mechanical center. Furthermore, the spherical outer races of the spherical roller bearings 39 accommodate misalignment of the motor shaft 11 and high speed shaft 13, whether such misalignment be angular or parallel.

The second embodiment of the invention illustrated in FIG. 3, does not depend upon the use of spherical roller bearings for the accommodation of shaft misalignment. In describing the embodiment of FIG. 3, like reference numerals will be used to designate like portions of the embodiment of FIG. 2. A first clutch assembly or structure 52 includes a hub 53 keyed to the motor shaft 11 for rotation therewith, and such hub 53 mounts a cage structure identical to that of the embodiment of FIG. 2. A second clutch assembly 54 includes the hub 24 and the drum member 35 joined together with an annular support member 55 sandwiched therebetween. A similar support member 55 is secured by studs 56 to the interior surface of the hub 53. The support members 55 include axially extending portions 57 which terminate in inwardly directed annular flanges 58.

A shaft 59 is disposed in the space between the shafts 11 and 13 with its ends located within the axially extending portions 57 of the support members 55. One end of the shaft 59 is provided with an enlarged diameter portion 60 which in turn has an annular upset portion 61 provided with a spherically crowned outer surface formed thereon. Such crowned outer surface seats with a radially inner circular cylindrical surface of the axially extending portion 57 of the respective support member 55. A snap ring 62 is disposed within a slot formed in the support member 55 to limit the axial movement of the shaft 59 between the snap ring 62 and the flange 58 of the support member.

The opposite end of the internally disposed shaft 59 is provided with a portion of reduced diameter 63 which supports the inner race of ball bearing 64. The outer race of the ball bearing 64 mounts a sleeve 65. The sleeve 65 is likewise provided with a spherical crowned annular upset portion 66 that seats against the underside of the axially extending portion 57 of the respective support member 55 and is axially located between a snap ring 67 and the flange 58. The ball bearing 64 is located axially by shoulders formed on the shaft 59 and the sleeve 65 and by snap rings 68 and 69 fitted within the shaft 59 and sleeve 65, respectively. The crowned upset portions 61 and 66 are provided with axial slots 70 that receive the projecting ends of dowels 71 received in the support members 55 and held in place by set screws 72. The dowels 71 cause the shaft 59 to rotate with the second clutch assembly 54 and the sleeve 65 to rotate with the first clutch assembly 52, with relative rotation of the clutch assemblies being permitted by the ball bearing 64.

Suitable grease fittings and ports may be provided to lubricate the ball bearing 64 and the spherically crowned upset portions 61 and 66. O-rings 73 are mounted in the flanges 58 of the support members 55 to work against the enlarged portion 60 of the shaft 59 and the sleeve 65. An oil seal 74 is provided in an inwardly projecting portion of the sleeve 65 to work against the shaft 59. Thus, lubricant will not be permitted to enter the interior of the clutch.

Again, the clutch assemblies 52 and 54, and thus the shafts 11 and 13, are axially restrained and located by the described construction. The spherically crowned upset portions 61 and 66 permit the shaft 59 to rock and the clutch is therefore able to accept angular and parallel misalignment of the connected shafts.

It will be appreciated from the foregoing that the applicant has provided a rotary fluid pressure clutch that effectively axially joins the connected driving and driven shafts without destroying the ability of the clutch to accept misalignments of the shafts. This has been accomplished in an efficient construction that is disposed entirely in the space between the connected shafts and therefore results in a compact unit.

I claim:

1. A clutch comprising: a pair of rotary structures, one of said rotary structures including fluid pressure means adapted to be actuated to effect a driving relationship between said structures and adapted to be deactuated to break such relationship; a shaft disposed internally of said structures; means pivotally mounting each end of said internally disposed shaft in a respective one of said rotary structures, one of said means including anti-friction bearing means permitting relative rotation between said internally disposed shaft and one of said rotary structures; and means axially restraining said rotary structures relative to said internally disposed shaft.

2. A clutch for connecting spaced, substantially aligned driving and driven shafts, comprising: a pair of rotary structures each adapted to be mounted on one of said driving and driven shafts for rotation therewith, one of said rotary structures including fluid pressure means expandable to effect a driving relationship between said structures and contractable to break such relationship; a shaft disposed internally of said structures in the space between said driving and driven shafts and substantially aligned with said shafts; means pivotally mounting each end of said internally disposed shaft in a respective one of said rotary structures, one of said means including anti-friction bearing means permitting relative rotation between said internally disposed shaft and one of said rotary structures, and means axially restraining said rotary structures relative to said internally disposed shaft.

3. A clutch for connecting spaced, substantially aligned driving and driven shafts, comprising: a pair of rotary assemblies each adapted to be mounted for rotation with one of said driving and driven shafts and being adapted for frictional engagement with each other, one of said rotary assemblies including fluid pressure means expandable to effect a driving relationship between said assemblies and contractable to break such relationship; a shaft disposed internally of said assemblies in the space between said driving and driven shafts and substantially aligned with said shafts; a shaft supporting member associated with each of said assemblies and disposed about a respective end of said internally disposed shaft; mounting means operative between each end of said internally disposed shaft and a respective shaft supporting member, each of said mounting means pivotally supporting said internally disposed shaft and at least one of said mounting means including an anti-friction bearing; and means axially restraining said mounting means between said internally disposed shaft and said shaft supporting members so that said rotary assemblies are axially located and restrained by said internally disposed shaft.

4. A clutch comprising: a pair of rotary assemblies, one of said rotary assemblies including fluid pressure means adapted to be actuated to effect a driving relationship between said assemblies and adapted to be deactuated to break such relationship; a shaft disposed internally of said assemblies; a shaft supporting member associated with each of said assemblies and disposed about a respective end of said internally disposed shaft; and a pair of spherical roller bearings, each having its inner race mounted upon and axially restrained relative to an end of said internally disposed shaft and each having its outer race mounted within and axially restrained relative to a respective one of said shaft supporting members so that said rotary assemblies are axially located and restrained by said internally disposed shaft when said fluid pressure means is actuated or deactuated.

5. A clutch for connecting spaced, substantially aligned driving and driven shafts, comprising: a pair of rotary assemblies each adapted to be mounted for rotation with one of said driving and driven shafts and being adapted for frictional engagement with each other, one of said rotary assemblies including fluid pressure means expandable to effect a driving relationship between said assemblies and contractable to break such relationship; a shaft disposed internally of said assemblies in the space between said driving and driven shafts and substantially aligned with said shafts, a shaft supporting member associated with each of said assemblies and disposed about a respective end of said internally disposed shaft; and a pair of spherical roller bearings, each having its inner race mounted upon and axially restrained relative to an end of said internally disposed shaft and each having its outer race mounted within and axially restrained relative to a respective one of said shaft supporting members.

6. A clutch comprising: a pair of rotary assemblies, one of said rotary assemblies including fluid pressure means adapted to be actuated to effect a driving relationship between said assemblies and adapted to be deactuated to break such relationship; a shaft disposed internally of said assemblies; a shaft supporting member associated with each of said assemblies and disposed about a respective end of said internally disposed shaft, each of said members being provided with an axially directed cylindrical surface; anti-friction bearing disposed about one end of said internally disposed shaft and axially restrained thereupon; and a sleeve disposed about said anti-friction bearing and axially restrained thereupon, and said sleeve and the other end of said internally disposed shaft each having a portion provided with a spherical surface that engages said cylindrical surface of a respective one of said shaft supporting members for pivoting of either end of said internally disposed shaft relative to said rotary assemblies, and said portions of said sleeve and said other end of said internally disposed shaft being axially restrained relative to said shaft supporting members so that said rotary assemblies are axially located and restrained by said internally disposed shaft when said fluid pressure means is actuated or deactuated.

7. A clutch for connecting spaced, substantially aligned driving and driven shafts, comprising: a pair of rotary assemblies each adapted to be mounted for rotation with one of said driving and driven shafts and being adapted for frictional engagement with each other, one of said rotary assemblies including fluid pressure means expandable to effect a driving relationship between said assemblies and contractable to break such relationship; a shaft disposed internally of said assemblies in the space between said driving and driven shafts and substantially aligned with said shafts, a shaft supporting member associated with each of said assemblies and disposed about a respective end of said internally diposed shaft, each of said members being provided with an inwardly facing, axially directed cylindrical surface; an anti-friction bearing disposed about one end of said internally disposed shaft and axially restrained thereupon, and a sleeve disposed about said anti-friction bearing and axially restrained thereupon, said sleeve and the other end of said internally disposed shaft each having an annular upset portion provided with a spherical outer surface that engages said cylindrical surface of a respective one of said shaft supporting members, and said annular upset portions being axially restrained relative to said shaft supporting members.

8. A rotary fluid pressure clutch for connecting spaced, substantially aligned driving and driven shafts, comprising: a pair of rotary assemblies each including a hub portion adapted to be mounted upon a respective one of said driving and driven shafts for rotation therewith, an annular bearing support portion projectable beyond the end of a respective one of said driving and driven shafts within the space between said shafts, and a clutch portion adapted for frictional engagement with the other clutch portion; fluid pressure means mounted on the clutch portion of one of said rotary assemblies and expandable to effect a driving relationship between said clutch portions and contractable to break such relationship; a shaft disposed with its ends within said support portions in the space between said driving and driven shafts and substantially aligned with said shafts; and a pair of spherical roller bearings each having its inner race mounted upon and axially restrained relative to one end of said internally disposed shaft and each having its outer race mounted within and axially restrained relative to a respective one of said support portions.

9. A rotary fluid pressure clutch for connecting spaced, substantially aligned driving and driven shafts, comprising: a pair of rotary assemblies each including a hub portion adapted to be mounted upon a respective one of said driving and driven shafts for rotation therewith, an annular support portion projectable beyond the end of a respective one of said driving and driven shafts within the space between said shafts, each of said support portions having an inwardly facing, axially directed cylindrical surface, and a clutch portion adapted for frictional engagement with the other clutch portion; fluid pressure means mounted on the clutch portion of one of said rotary structures and expandable to effect a driving relationship between said clutch portions and contractable to break such relationship; a shaft disposed with its ends within said support portions in the space between said driving and driven shafts and substantially aligned with said shafts; an anti-friction bearing disposed about one end of said internally disposed shaft and axially restrained thereupon; and a sleeve disposed about said anti-friction bearing and axially restrained thereupon, said sleeve and the other end of said internally disposed shaft each having an annular upset portion provided with a spherical outer surface that engages the cylindrical surface of a respective one of said support portions, and said annular upset portions being axially restrained relative to said support portions.

References Cited by the Examiner
UNITED STATES PATENTS 2,403,326    7/1946    Baker et al. _____ 192—110
3,197,005    7/1965    Ashton et al. _____ 192—110

DAVID J. WILLIAMOWSKY, *Primary Examiner.*

B. W. WYCHE III, *Assistant Examiner.*